United States Patent
Winburn et al.

(10) Patent No.: US 11,968,429 B2
(45) Date of Patent: Apr. 23, 2024

(54) ADAPTIVE USER INTERFACE BASED ON PROFILE DATA

(71) Applicant: WarnerMedia Direct, LLC, New York, NY (US)

(72) Inventors: Michael Winburn, Seattle, WA (US); Anthony van Winkle, Seattle, WA (US); Allen Gay, Shoreline, WA (US); Cengiz Kaygusuz, Shoreline, WA (US)

(73) Assignee: WARNERMEDIA DIRECT, LLC, New York, NY (US)

( * ) Notice: Subject to any disclaimer, the term of this patent is extended or adjusted under 35 U.S.C. 154(b) by 31 days.

(21) Appl. No.: 17/329,478

(22) Filed: May 25, 2021

(65) Prior Publication Data

US 2021/0377614 A1    Dec. 2, 2021

Related U.S. Application Data

(60) Provisional application No. 63/030,073, filed on May 26, 2020.

(51) Int. Cl.
| | | |
|---|---|---|
| *H04N 21/475* | (2011.01) | |
| *H04N 21/258* | (2011.01) | |
| *H04N 21/2668* | (2011.01) | |

(52) U.S. Cl.
CPC ... *H04N 21/4751* (2013.01); *H04N 21/25883* (2013.01); *H04N 21/2668* (2013.01)

(58) Field of Classification Search
CPC ......... H04N 21/4751; H04N 21/25883; H04N 21/2668; H04N 21/431; H04N 21/25875
See application file for complete search history.

(56) References Cited

U.S. PATENT DOCUMENTS

| | | |
|---|---|---|
| 8,640,190 B1 | 1/2014 | Banerjee |
| 9,323,352 B1 * | 4/2016 | Haskin ................. G06F 3/0481 |

(Continued)

FOREIGN PATENT DOCUMENTS

WO    2019234747 A1    12/2019

OTHER PUBLICATIONS

International Search Report and Written Opinion for International Application No. PCT/US2021/034047 dated Aug. 10, 2021, 15 pages.

(Continued)

*Primary Examiner* — Kunal Langhnoja
(74) *Attorney, Agent, or Firm* — Amin, Turocy & Watson, LLP

(57) ABSTRACT

The disclosed technology is directed towards selecting and returning a user interface, such as of a streaming media service, that is based on a child user's age. As a child ages, the child receives a generally more sophisticated user interface, such that a younger child needs only simple interaction to select a desired (for example age-appropriate) content offering, while an older child can use more complex interaction to locate and select a desired content offering. Profile data associated with the user is sent with each request for content, including the request for a user interface, starting with a home page. The age of the user can be determined from the profile data with any request, whereby a user interface can appear to adapt based on user age over time. The profile data can be locked to a device to retain the profile data after a logoff/new login operation.

20 Claims, 11 Drawing Sheets

(56) References Cited

U.S. PATENT DOCUMENTS

| | | | |
|---|---|---|---|
| 2014/0059636 A1* | 2/2014 | Patel | H04N 21/443 725/132 |
| 2015/0207853 A1 | 7/2015 | Heinberg | |
| 2016/0012048 A1* | 1/2016 | Yellin | H04N 21/4661 707/722 |

OTHER PUBLICATIONS

International Preliminary Report on Patentability for International Application No. PCT/US2021/034047 dated Dec. 8, 2022, 9 pages.

* cited by examiner

ADAPTIVE USER INTERFACE BASED ON PROFILE DATA

CROSS-REFERENCE TO RELATED APPLICATION

This application claims priority to U.S. provisional patent application Ser. No. 63/030,073 filed May 26, 2020. The entirety of the aforementioned application is hereby incorporated by reference herein.

COPYRIGHT DISCLAIMER

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject application relates to video media, including streaming video content in general, and more particularly to a user interface for a media service and related embodiments.

BACKGROUND

Within an entertainment service provider's content offerings, the interactive user interface available for selecting content such as streaming video is aimed at adult users, and is generally standard among types of devices. Generally there is a way for adult users to restrict certain content based on ratings, needing a password or PIN (Personal Information Number) to control such settings. In this way, younger viewers may not see or otherwise be allowed to select certain content offerings, but that is generally the only difference in the user experience.

In many typical family scenarios, there are different types of users other than adults. Ages can range from very young children to adolescents to teenagers, whereby standard user interfaces are not particularly fitting.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
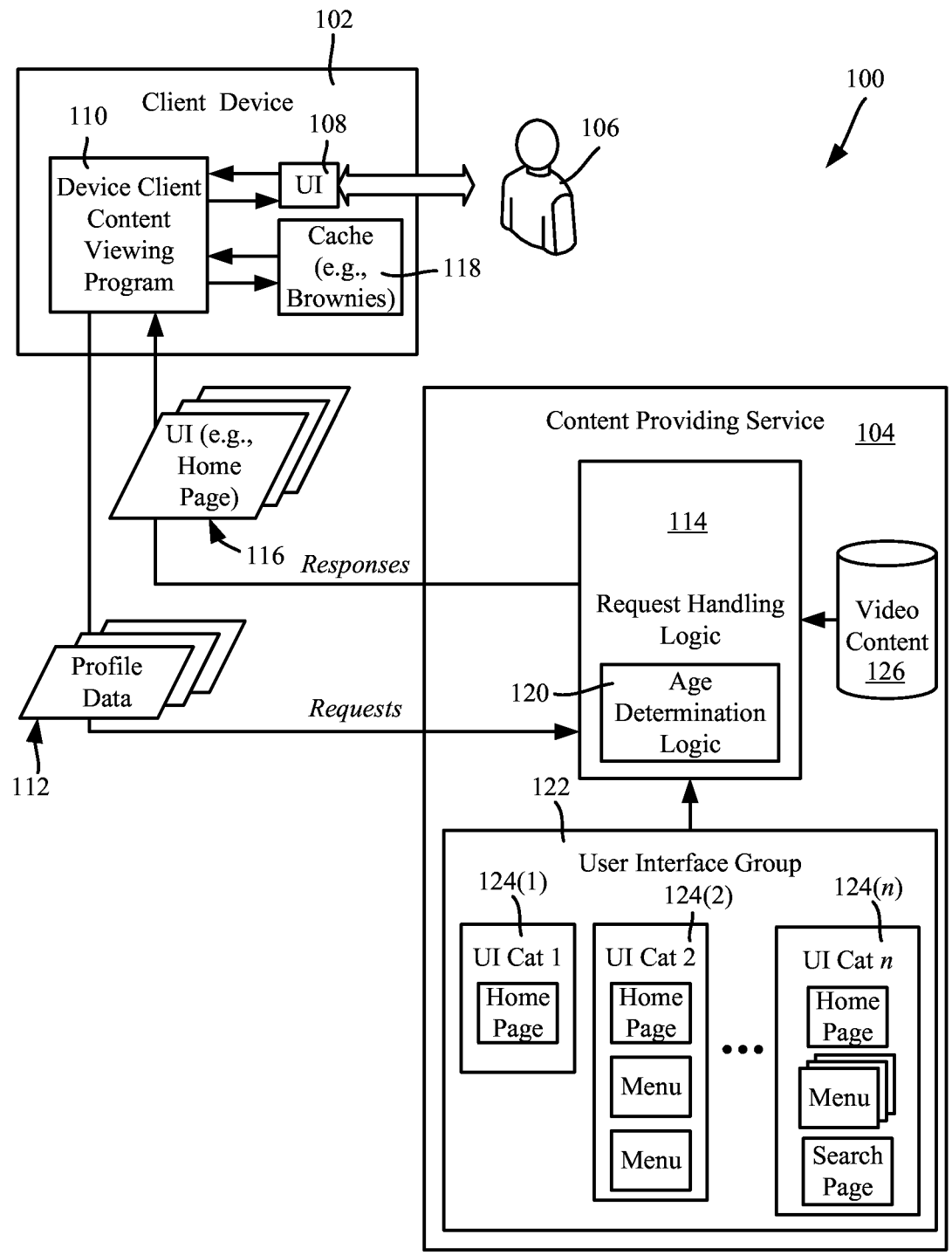
FIG. 1 is a block diagram illustrating an example system in which a content providing (e.g., streaming media) service provides age-adapted content to a user based on user profile data, in accordance with various aspects and embodiments of the subject disclosure.

Described herein is a technology in which an interactive user interface that a user (viewer) obtains and interacts with to select content depends on the user's profile data, which can include age-related data for a child. With this technology, for example, the interactive user interface adapts as the user gets older, such that a child below a certain age such as five and below automatically interacts with a less sophisticated user interface relative to the user interface a child receives when that child reaches the age of six, and so on, as well as possibly some different content offerings.

In general, the curation (e.g., of content) and the home page appearance is done in such a way that the viewer is exposed to content via a user interface that is more appropriate for his or her age. The profile data of a child can contain the child's birthdate, or for more privacy in one implementation, the birth year and month, without the specific date of the month.

In one implementation, child profiles can be categorized by age ranges, such as two-to-five, six-to-nine, ten-to-twelve and thirteen and over. In such an implementation, the age range categorization can be computed whenever the child viewer logs into the application, whereby from the user's perspective, the user interface automatically adapts to the user's age. Users can thus "age-up" at an appropriate login date. Note that the "aging-up" experience can be limited to child age categories, whereby a user does not grow from the (oldest) child profile to an adult profile. Notwithstanding, in alternative implementations it is feasible to convert to an adult user profile at a certain age (e.g., eighteen), and it is also feasible to change adult profiles based on adult ages, such as to present larger user interface elements to older users whose eyesight may be diminishing.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

FIG. 1 is a block diagram of a system 100 showing example components and an example flow of data between a user device 102 and a content providing service 104 such as a streaming video service. In one implementation, a user 106 interacts with a user interface 108 which is part of a device client content viewing program 110, or more simply, a device client program. The device client program 110 is supplied and managed by the content providing service 104, and for example can be downloaded by a user from a mobile device store as an application, downloaded via the internet for a personal computer/laptop or smart television, installed on a television set/set-top box by a vendor, and so forth.

In general, for example, a streaming service can transmit media and other entertainment content over the Internet to an end-user. The user interface 108 associated with the content providing service 104 (e.g., streaming service) allows the user to locate and select a particular content to watch/experience from various content offerings provided by the streaming service. In addition, the user interface 108 can also provide content recommendations to the end-user, maintain a watch/experience list of content and provide parental controls to enhance the streaming experience.

In one implementation, the device client program 110 sends requests 112 to the content providing service 104, where request handling logic 114 (e.g., on a front end server) determines where to route the request data for further processing so as to return appropriate responses 116. For example, a login request can be routed to authentication processing logic (not explicitly shown) to authenticate a user/subscriber identity based on a password or the like. Once logged in, content such as a home page can be returned in another response to a request for content, menus can be provided, selected video content can be streamed and so forth via appropriate responses 116 as described herein.

As described herein, different users on the same subscriber login credentials can have different profile types and profile data. For example as described herein, there can be kids/child profile types and adult profile types. Profile types can directly influence the type of content shown to the users. Further, within the kids profile data, there can be age data per child, which in one implementation comprises the birth date and month of the child, entered when the profile is set up for the child user by a parent or guardian, for example.

In order to avoid having to repeatedly look up profile data of a logged in user, once logged in the profile data can be sent with each request. One way this can be accomplished is by storing data (e.g., key-value pairs) in a cache 118 on the client device 102.

In one implementation, a caching technology, referred to as "brownies" is used to transfer information between the client device program 110 and content service. Brownies are strictly controlled by the client device program 110 that is provided by the content service; note that this is unlike conventional cookies that possibly can be handled by the platform (e.g. browser, the operating system, middleware, and so forth) on which a client application runs. Brownies carry the profile data (e.g. profile type and age categories) to the client device 102 and device client program 110. The device client program 110 stores these profile data values, e.g., in the cache 118, and passes them to the content providing service 104 each time the device client program 110 requests content. When serving specific pages, the content providing service 104 uses the information (profile data) that is contained in the brownie to select the appropriate pages. As an example, when the profile type corresponds to "kids" or the like and the requested page is the home page, the content service provider returns a different home page to the user relative to the home page returned to the user when the profile type corresponds to "adults" or the like.

Moreover, users having the kids profile type can be subcategorized by age. To this end, the profile data (e.g., sent via the brownie information) for a kids type profile can contain a child's age information, which in one implementation is the child's birth year and birth month. Age determination logic 120 coupled to or incorporated into the request handling logic 114 can determine the child user's age based on the profile data and the current date, and can thereby select a different user interface from a group of available user interfaces 122 according to the determined age.

In one implementation, the child user's determined age is mapped into a category according to a range of ages. A non-limiting, example default set of categories corresponds to age ranges two-to-five, six-to-nine, ten-to-twelve and thirteen and over.

Each category maps to a different set of user interfaces 124(1)-124(n). In this way, for example, a younger child can receive a different user interface with which to interact and thereby have a different user experience from that of an older child. In general, visual elements are more prevalent than text in the youngest (e.g. age two to five) profile category, as most children at such ages are not able to read, at least not particularly well. As a child ages, the user interface automatically adapts from the child user's perspective, for example to include more text, more sophisticated interaction capabilities (e.g., search, more submenu categories) and so on. Further, the video content 126 available for viewing can be selected (e.g., filtered) based on the age data.

Figure 2:
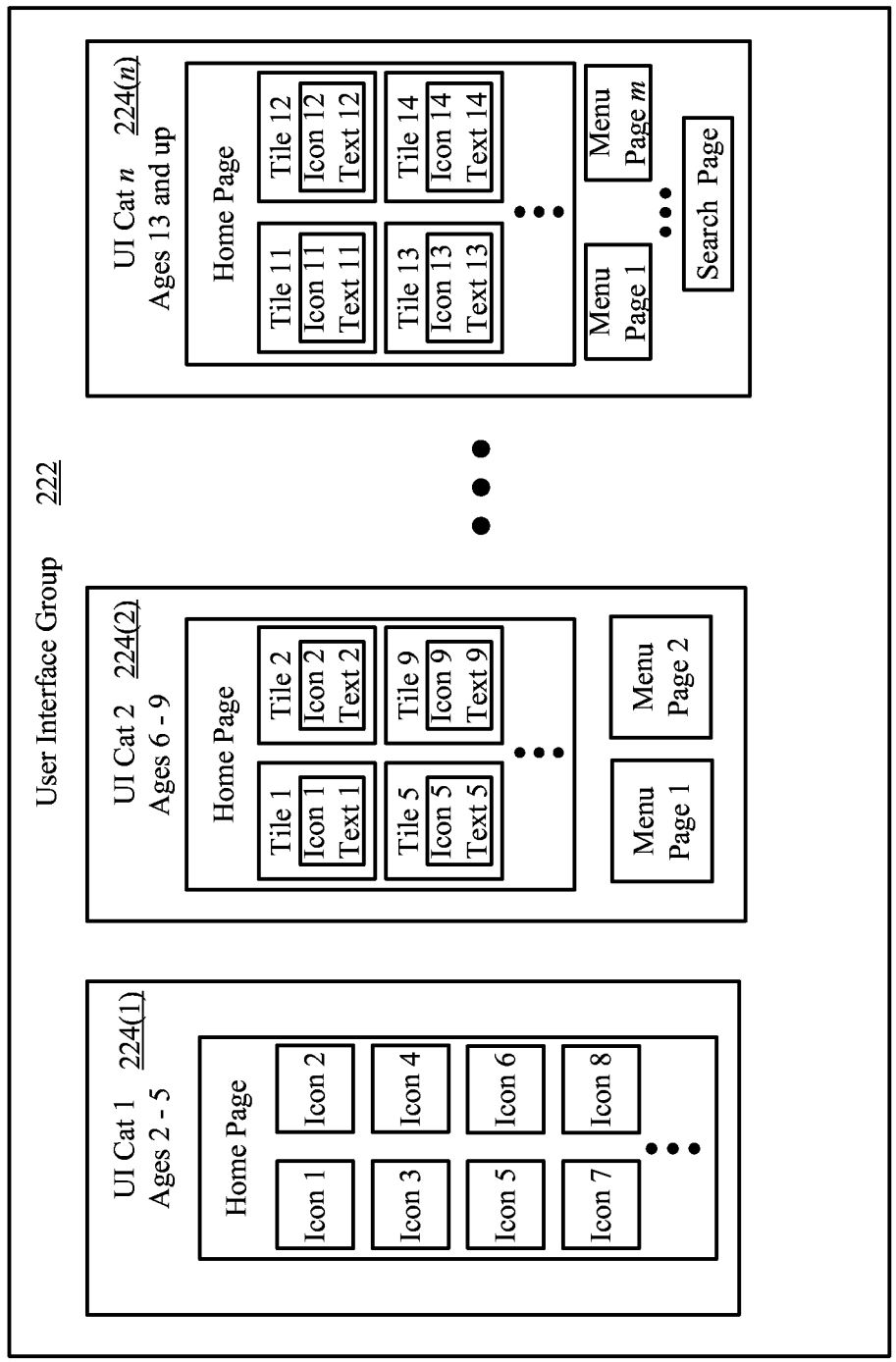
FIG. 2 is a block diagram illustrating an example group of user interfaces that can be selected based on user profile data corresponding to age information, in accordance with various aspects and embodiments of the subject disclosure.

By way of a non-limiting example, and only for the purpose of emphasizing different user interfaces, FIG. 2 shows a group 222 of different user interface categories corresponding to different user interfaces/user interface styles 224(1)-224(n). Of the three user interfaces detailed, it can be seen that the user interface 224(1) corresponding to age range 2-5 has a style that is only a single home page with relatively large icons, such as a simple image representing the main character in a television show or movie. The primary interaction is simply to select one such icon to start streaming the corresponding content, for example, although basic scrolling and the like may be provided. Note however that this is only a simplified example user interface and style, and it may be beneficial to add simple text such as letters, numbers, color labels (e.g., "red" when a red background is shown) so that younger children are inherently assisted in learning to read.

In contrast, the user interface 224(2) corresponding to age range 6-9 has tiles with icons/images accompanied by text, which can be full words, titles and so forth. There are also submenus that can be invoked, such as by clicking on a tile to see "comedy" or "action" content offerings. At least some of the content being offered can also be more age appropriate for this age range.

The user interface 224(n) corresponding to ages 13 and above is shown with at least some different content offerings, more submenus, and a search page or the like. In general, the user interface 224(n) corresponding to ages 13 and above can appear like an adult profile's user interface, but with restricted content offerings, generally limited by a content offering's associated rating and the device client program's parental control settings.

Although FIG. 2 is only a simplified example shown to emphasize possible differences, it is seen that the user interface can appear to adapt to a child user's age. The age ranges shown are also only examples; these ranges can be modified by the content providing service. Moreover the rages may be made user configurable by a parent/guardian with the appropriate password or PIN, so that, for example, a child age four who is able to read can be up-leveled to the higher-age user interface without having to fool the system by entering an earlier birthdate. This can allow the content providing service to differentiate between the user interface presented to the user and the content being offered; for example, a four year old can be given the more sophisticated user interface of the next age range category, yet only be able to see and select content of the actual age category of two-to-five. Similarly, a six year old can be held at the less sophisticated user interface of the younger age range category, yet be able to see and select content of the actual age category of six-to-nine.

Figure 3:
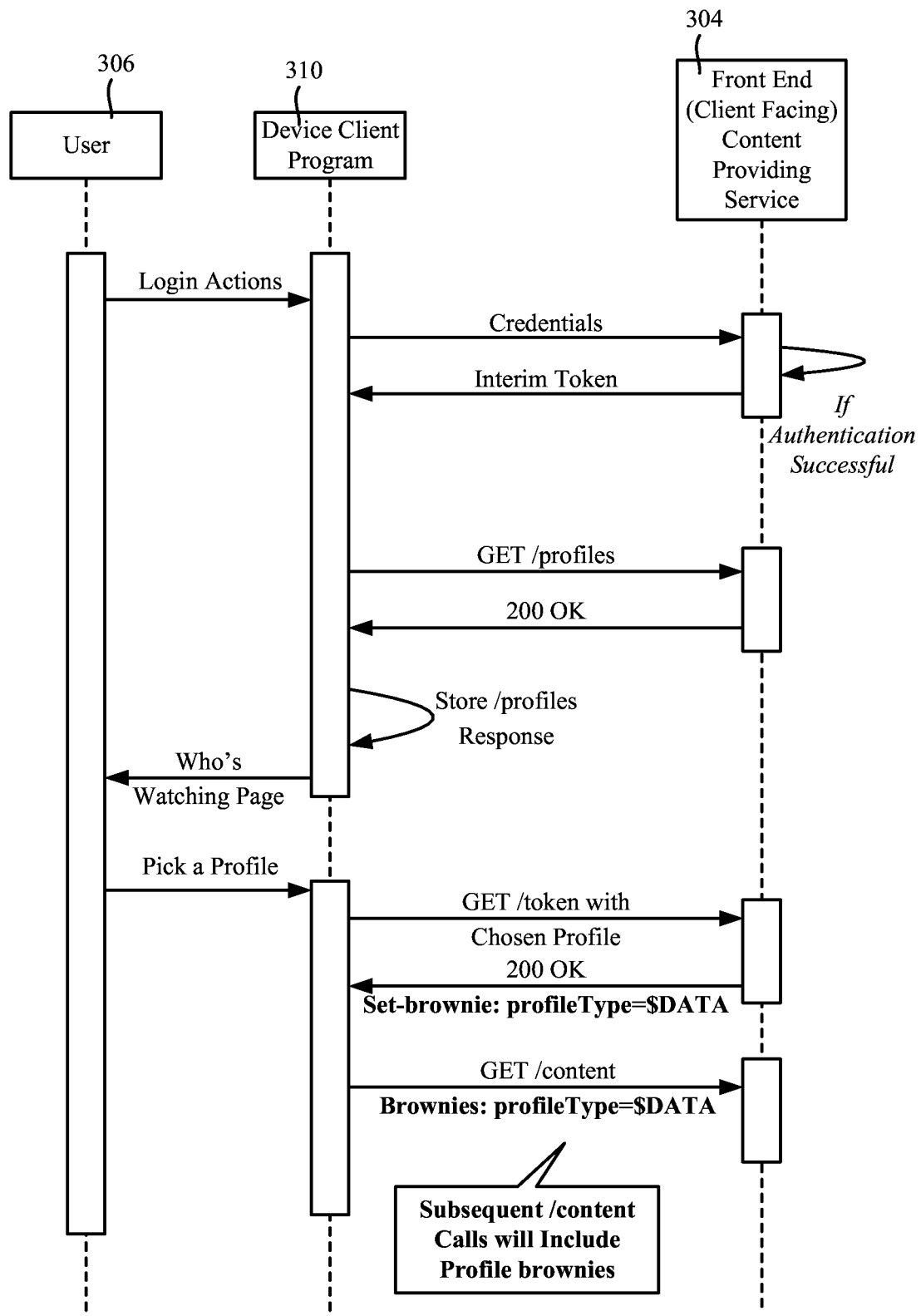
FIG. 3 is sequence diagram illustrating operations, communications and dataflow between a user and example components of a system that provides age-adapted content to a user, in accordance with various aspects and embodiments of the subject disclosure.
Figure 4:
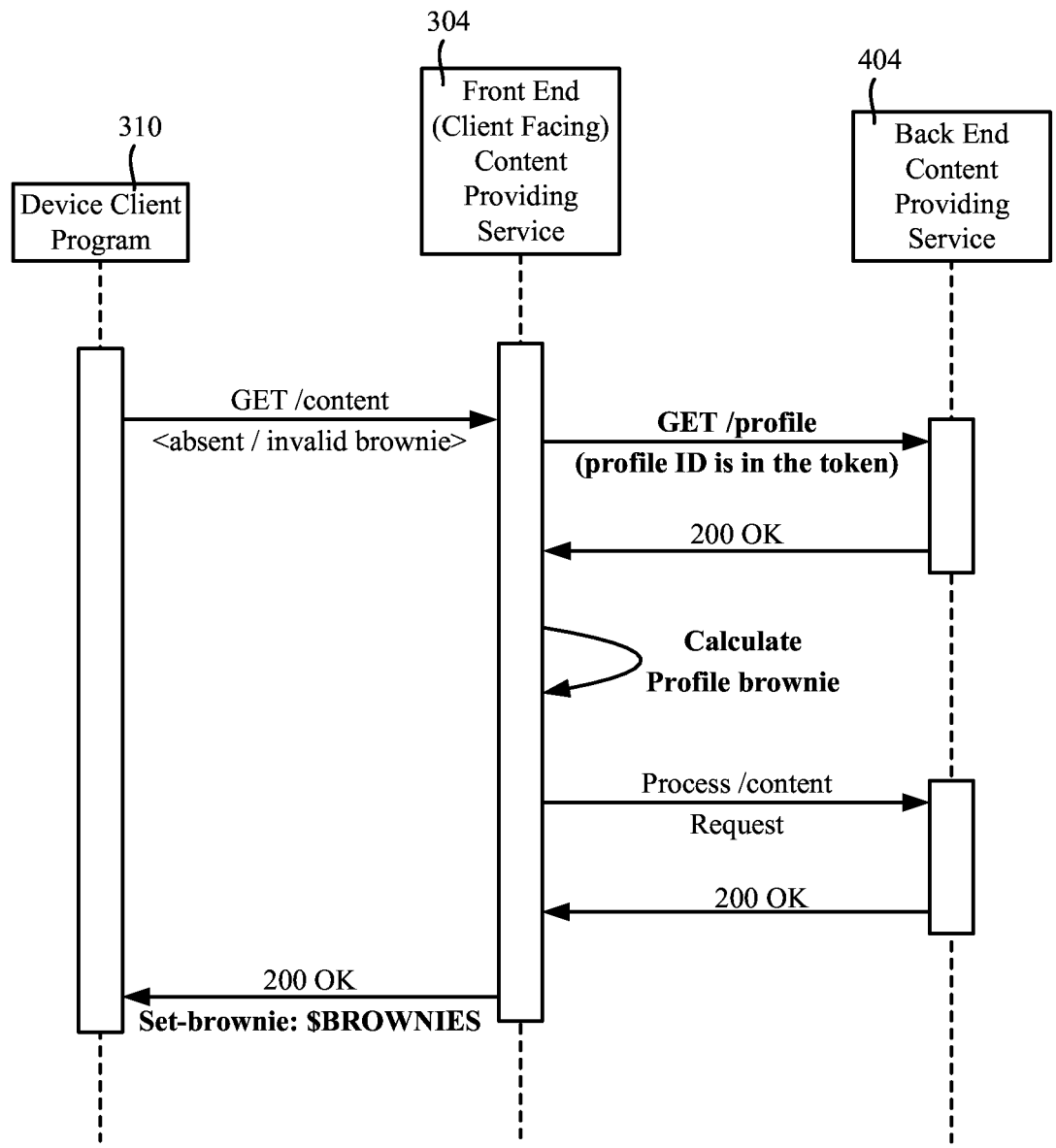
FIG. 4 is sequence diagram illustrating operations, communications and dataflow between example components of a system to overcome and error in order to provide age-adapted content to a user, in accordance with various aspects and embodiments of the subject disclosure.
Figure 5:
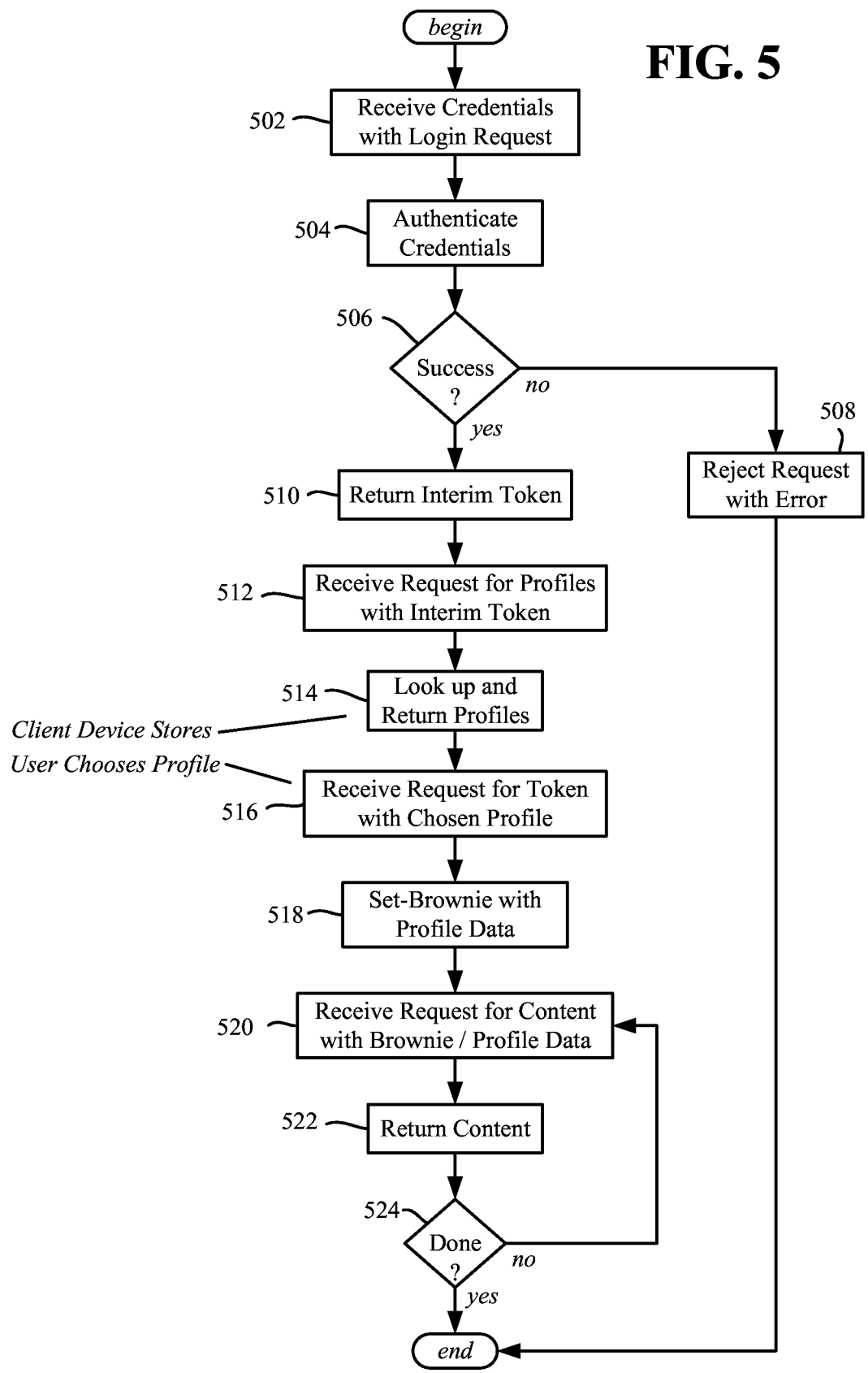
FIG. 5 is a flow diagram illustrating example operations of a content providing service to handle a user's profile data, in accordance with various aspects and embodiments of the subject disclosure.

FIGS. 3-5 describe an example implementation based on using brownies to pass information and handle requests and responses. In general, as shown in the data and communication flow in FIG. 3, a user 306 (e.g., subscriber) of the service performs login actions by interacting with an instance of the device client program 310. In turn, the device client program 310 sends credentials to a front end (client facing) portion of the content providing service 304 for authentication. Assuming successful authentication, the front end content providing service 304 returns an interim token (that identifies the subscriber) to the device client program 310. Corresponding operations of the content providing service are shown in FIG. 5, operations 502, 504, 506 and 510. Operation 508 represents handling an unsuccessful authentication attempt.

Returning to FIG. 3, the device client program 310 sends a "GET" request for the profiles associated with the credentials, accompanied by the interim token that identifies the subscriber and by which the corresponding profiles can be located by the content providing service 304. The profiles are looked up and returned to the device client program 310 in a corresponding (e.g., HTTP 200) response; this is also represented by operation 514 of FIG. 5. The device client program 310 stores (e.g., caches) the profiles information.

At this point, the device client program 310 knows the available profiles and presents them to the user for selection, e.g., on a "Who's Watching" page rendered by the device client program 310. The user selects a profile, (although as described herein, the profile can be locked to a device and automatically chosen until unlocked by a parent/guardian).

After the user picks a profile, the front end service 304 receives the selected profile at operation 516, e.g., via a GET/token request from the device client program 310. Once received, a new token that includes the profile data (e.g., profile ID) is generated. The response to this request from the front end service 304 (also shown at operation 518 of FIG. 5) includes and sets (via the device client program 310) the brownie data that are to be returned by the device client program 310 with subsequent requests for content. Note that an alternative is to use the stored/profiles response, however this is generally inflexible, as if a backwards-incompatible change to the profile structure is needed, the device client program would need to be updated in a new release to handle the changed procedure.

As shown in FIG. 3 and FIG. 5, operations 520 and 522, subsequent requests for content include the brownie/profile data, until the user is done (operation 524). As can be seen, brownies allow a content providing service that serves the content to be related to subsystem that stores the profile type data, approximately at the login time only. This achieves efficiency (lower latency) in profile type lookup, while further making the overall system tolerant to faults that can arise in the profile server. The brownies can be encrypted (e.g., using standard encryption mechanisms) to prevent tampering and potential privacy leaks. Brownies are also extensible, in that adding new data to a brownie does not require a client update.

It should be noted that brownies are only one advantageous and efficient way to retrieve profile-based content from the content providing service. As another alternative, the device client can be explicitly programmed to fetch profile information from the content providing service, and pass the relevant parts of the profile information to the content providing service when requesting content. Other technologies are also feasible.

FIG. 4 shows a dataflow/communication sequence diagram for handling an error case in which profile headers containing the brownie data are absent or contain invalid data when provided with a GET request for content. In such a situation, a back end portion of the content providing service 404 (which normally just provides content to the front end portion 304 when requested) is invoked by the front end portion 304 using the token to recover the profile data (ID). With the profile data obtained via the token, the front end (client-facing) content providing service 304 recalculates the profile brownie, requests the content as needed from the back end portion of the content providing service 404, and resets the brownie on the client device via the device client program 310. As can be seen, the brownie technology is thus tolerant to such a fault.

As described herein, profiles for multiple users can be set on the content providing (streaming) service. The list of content displayed can be personalized for each of the multiple users. To this end, once installed, upon entering the content viewing program, a loading page is displayed that allows the user to create a profile for one or more users (including kid profiles). Thereafter, the landing page for a user can include a hero carousel, comprising a list of content that the user can continue to watch and a list of content that the end-user would likely want to watch/experience. The list of content that the end-user would likely want to watch/experience can include content added by the end-user as well as recommended content based on the end-user's media consumption behavior. A side menu can be used to access list of movies and shows that have been previously released as well as original programming available on the service. In addition, content that has been just added to the service as well as leaving the service can be accessed via the side menu. Content that will be available on the service in the near future can also be accessed from the side menu.

Parents/guardians (or other responsible parties such as a trusted babysitter) can set up a user profile for a child, as well as different user profiles for different children. A parent/guardian can set up a PIN/password that will keep the child in a "walled garden" and prevent the child from accessing content that the parent/guardian has deemed as not suitable for the child.

In one implementation, for each child whose profile is being created, the parent/guardian provides a user name as well as the month and year of birth for each child whose profile is being created. Furthermore, the parent/guardian can set parental controls that allow the maximum ratings for movies and television shows; there can be a different maximum rating set for movies relative to the maximum rating set for television shows. The parental control settings can be pre-populated based on the child's age, in which event the parent can make the controls less or more restrictive as compared to the pre-populated settings. The pin/password is needed to change the parental controls, which can further help in keeping the child in the walled garden.

Further, a parent/guardian can require the PIN/password for the child to switch profiles to that of another user. By activating this option, the parent/guardian can login as the child, e.g., in a smart device handed to the child, and be confident that the child remains in the walled garden and is not able to access content that is not age appropriate. In this manner, the child's profile is locked. Because usually a child will access the streaming service on a device that is provided to the child by the parent, the lock on the child's profile can be maintained on that device, even when the child logs back into the service after logging out of the service. Locking the child's profile as opposed to locking the parent's profile means that the parent can freely watch content on other devices (e.g., devices in the home) without having to enter the PIN/password every time that the parent logs into the service.

The landing page associated with each child's profile can be curated to include content rated in accordance with the parent/guardian's maximum rating. For example, using concepts such as artificial intelligence (AI) and/or machine learning (ML), the system can be configured to automatically evolve the content offering to include higher-rated content as the child matures.

In addition, the video player controls/buttons can be tailored based on the child's age. For example, video player controls/buttons displayed to a younger child can be relatively large compared to the video player controls/buttons displayed to an older child who has better fine motor skills as compared to the fine motor skills of the younger child. Similarly using concepts such as artificial intelligence (AI) and/or machine learning (ML), the system can be configured to automatically evolve the video player controls/buttons as the child matures. Indeed, the system in general can be configured to evolve the overall user experience as the child matures.

Figure 6:
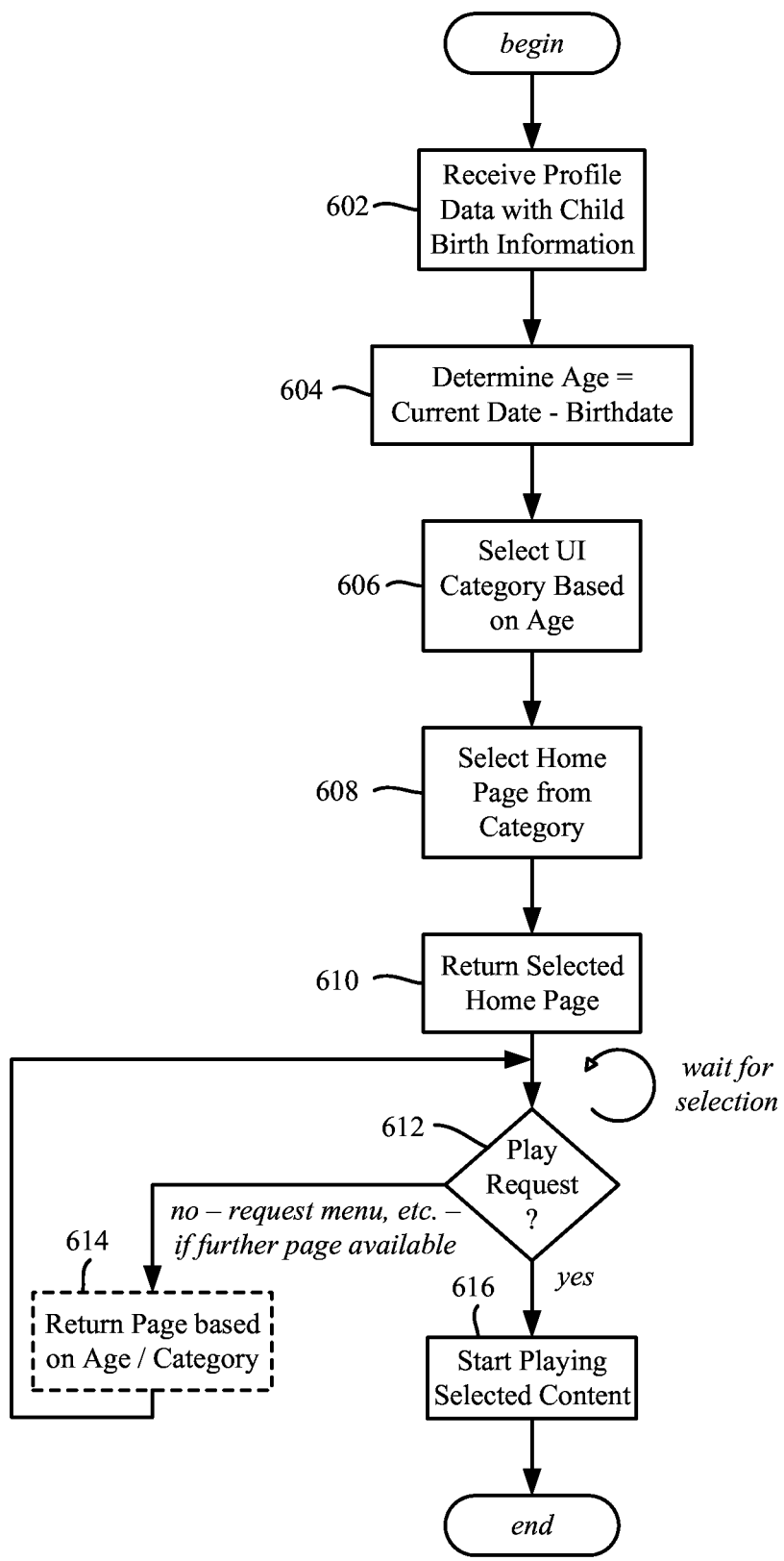
FIG. 6 is a flow diagram illustrating example operations of a content providing service to select and return content (e.g., a home page) to a user device based on a user's profile data, in accordance with various aspects and embodiments of the subject disclosure.

FIG. 6 shows logic performed by the service when a profile of type "kids" is received when requesting a home page at operation 602 that includes a child's birth information (e.g., birthdate approximated to month and year, or alternatively an exact birthdate). At operation 604, the child's age is determined based on the current date and the birthdate.

Once the age is determined, operation 606 selects a user interface (UI) category based on the age. Operation 608 selects the home page based on the UI (age-determined) category, which is returned via operation 610. At this point, various submenus and so forth may be available via user interaction with the home page, and if so, the submenus returned can also be age appropriate via operation 612 and 614. If play is requested for a selected content offering, operation 616 represents starting the playing (streaming) the content, which can continue until further interaction is detected.

Although not explicitly shown in FIG. 6, the content that is offered as well as the user interface presented to the user is ordinarily coupled to the age information/age category of the user. Notwithstanding, as described herein it is possible to decouple the user interface from the content offerings, such that a younger child can interact with a more sophisticated user interface but be limited to younger, age appropriate content is offered, or vice-versa such that an older child can interact with a less sophisticated user interface but be offered more age-appropriate content.

Figure 7:
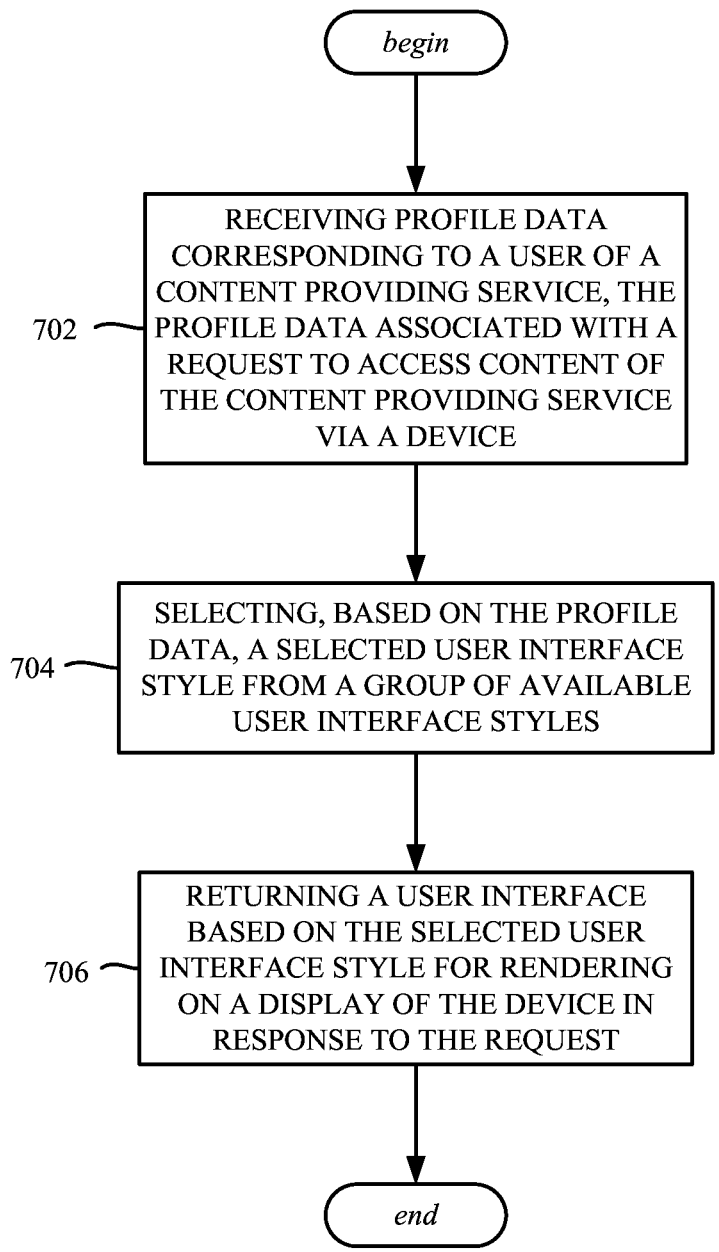
FIG. 7 is a flow diagram illustrating example operations of a content providing service for selecting a selected user interface style based on profile data, in accordance with various aspects and embodiments of the subject disclosure.

One or more aspects can be embodied in a system, such as represented in FIG. 7, and for example can comprise a memory that stores computer executable components and/or operations, and a processor that executes computer executable components and/or operations stored in the memory. Example operations can comprise operation 702, which represents receiving profile data corresponding to a user of a content providing service, the profile data associated with a request to access content of the content providing service via a device. Operation 704 represents selecting, based on the profile data, a selected user interface style from a group of available user interface styles. Operation 706 represents returning a user interface based on the selected user interface style for rendering on a display of the device in response to the request.

Further operations can comprise determining, from the profile data, whether the user is an adult type user or a kid user.

Further operations can comprise determining, from the profile data, an age of the user, and wherein the selecting the user interface style comprises selecting the user interface style from the group of available user interface styles based on the age of the user. Receiving the profile data can comprise receiving a birth month and year of the user. Further operations can comprise mapping the age to a category, in which the category is one of a group of categories corresponding to the group of user interface styles. Further operations can comprise selecting, based on the age of the user, a content offering to be presented on the user interface as available for selection.

Returning the user interface can comprise returning a home page.

Further operations can comprise setting the profile data on the client device for use with subsequent requests for content.

Further operations can comprise setting a brownie comprising the profile data on the client device for use with subsequent requests for content.

Further operations can comprise locking the profile data on the client device to retain the profile data, after a logoff operation, for use after a subsequent login operation.

Figure 8:
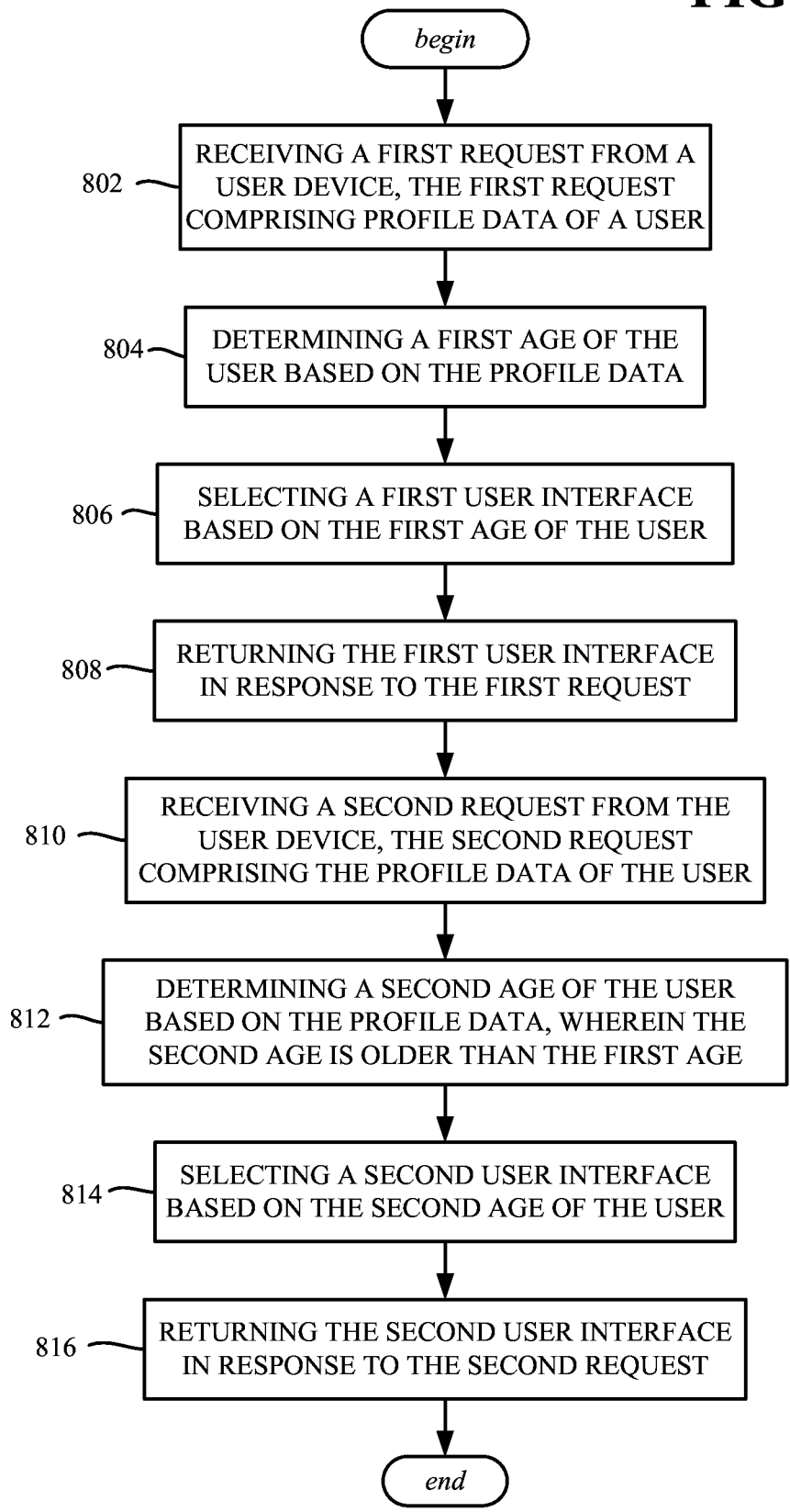
FIG. 8 illustrates a flow diagram illustrating example operations of a content providing service for returning different user interfaces based on different user ages, in accordance with various aspects and embodiments of the subject disclosure.

One or more aspects can be embodied in a system, such as represented in FIG. 8, and for example can comprise a memory that stores computer executable components and/or operations, and a processor that executes computer executable components and/or operations stored in the memory. Example operations can comprise operation 802, which represents receiving a first request from a user device, the first request comprising profile data of a user. Operation 804 represents determining a first age of the user based on the profile data. Operation 806 represents selecting a first user interface based on the first age of the user. Operation 808 represents returning the first user interface in response to the first request. Operation 810 represents receiving a second request from the user device, the second request comprising the profile data of the user. Operation 812 represents determining a second age of the user based on the profile data, wherein the second age is older than the first age. Operation 814 represents selecting a second user interface based on the second age of the user. Operation 816 represents returning the second user interface in response to the second request.

The profile data can comprise information that identifies the user as corresponding to a kids type profile.

The second user interface can comprise a representation of a content offering represented with more human-readable text than the first user interface.

The first user interface can comprise a representation of a content offering represented with a larger icon than the second user interface.

The first user interface can comprise representations of content offerings that are selected based on the first age, and the second user interface can comprise representations of content offerings that are selected based on the second age.

Further operations can comprise locking the profile data on the client device to retain the profile data, after a logoff operation, for use with a subsequent request for content after a subsequent login operation.

Figure 9:
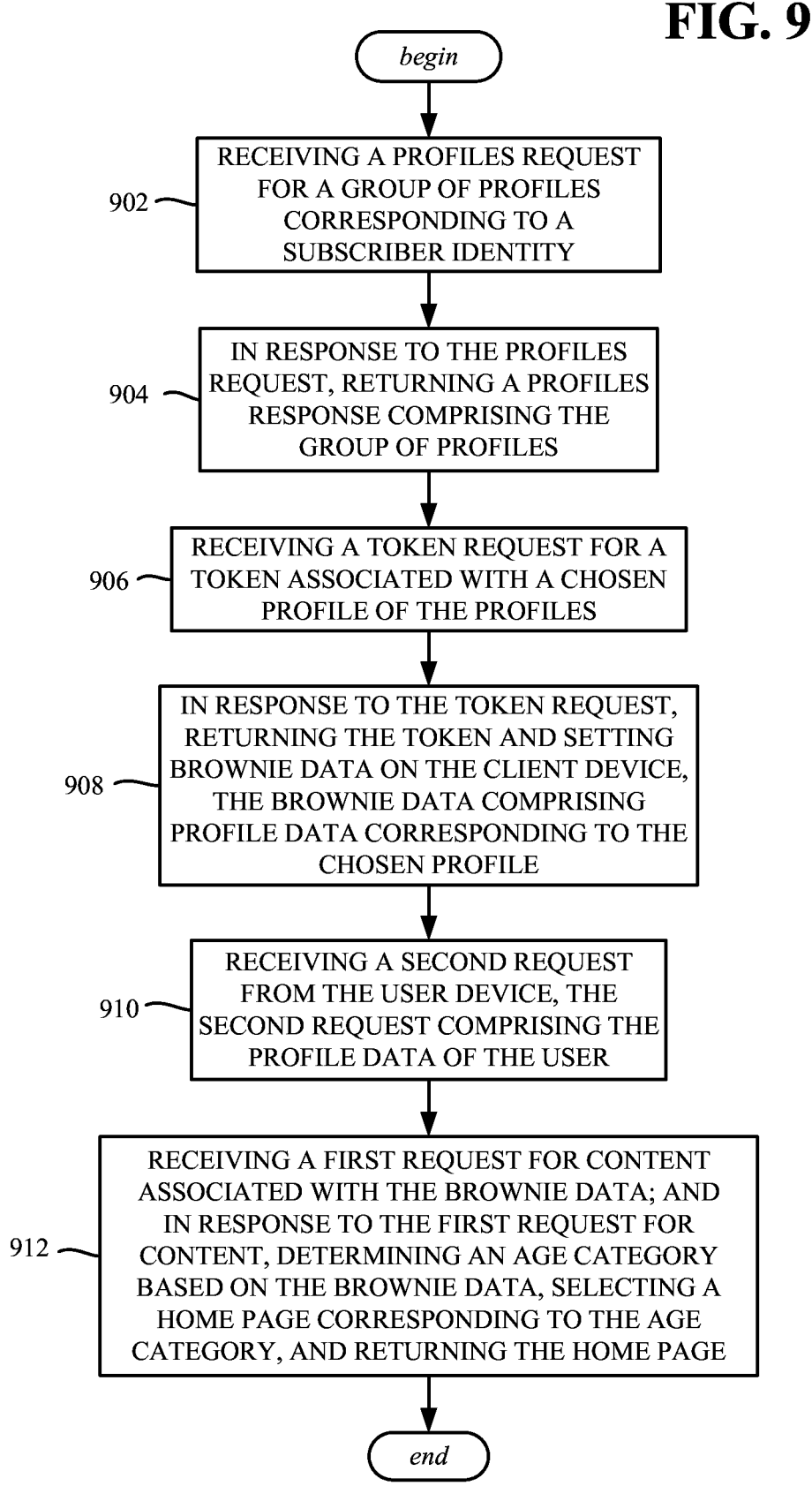
FIG. 9 illustrates example operations related to a content providing service's communications, including a request for content to return a home page based on a user's age category, in accordance with various aspects and embodiments of the subject disclosure.

FIG. 9 summarizes various example operations, e.g., corresponding to a machine-readable storage medium, comprising executable instructions that, when executed by a processor, facilitate performance of operations. Operation 902 represents receiving a profiles request for a group of profiles corresponding to a subscriber identity. Operation 904 represents in response to the profiles request, returning a profiles response comprising the group of profiles. Operation 906 represents receiving a token request for a token associated with a chosen profile of the profiles. Operation 908 represents in response to the token request, returning the token and setting brownie data on the client device, the brownie data comprising profile data corresponding to the chosen profile. Operation 910 represents receiving a first request for content associated with the brownie data. Operation 912 represents in response to the first request for content, determining an age category based on the brownie data, selecting a home page corresponding to the age category, and returning the home page.

Further operations can comprise receiving login credentials corresponding to a subscriber identity, authenticating the subscriber identity, returning an interim token in response to the receiving the login credentials, receiving the profiles request can comprise receiving the profiles request in association with the interim token.

Further operations can comprise receiving a second request for content associated with a token, the second request for content associated with invalid brownie data or unassociated with the brownie data, and in response to the receiving the second request, determining the profile data from the token, determining another instance of the brownie from the profile data, and resetting the brownie data on the client device based on the other instance of the brownie.

The request can comprise a first request for content, the age category can comprise a first age category, the home page can comprise a first home page, and further operations can comprise receiving a second request for content associated with the brownie data, and in response to the second request for content, determining a second age category, based on the brownie data, corresponding to an age that is older than the first age category, selecting a second home page corresponding to the second age category, and returning the second home page.

Figure 10:
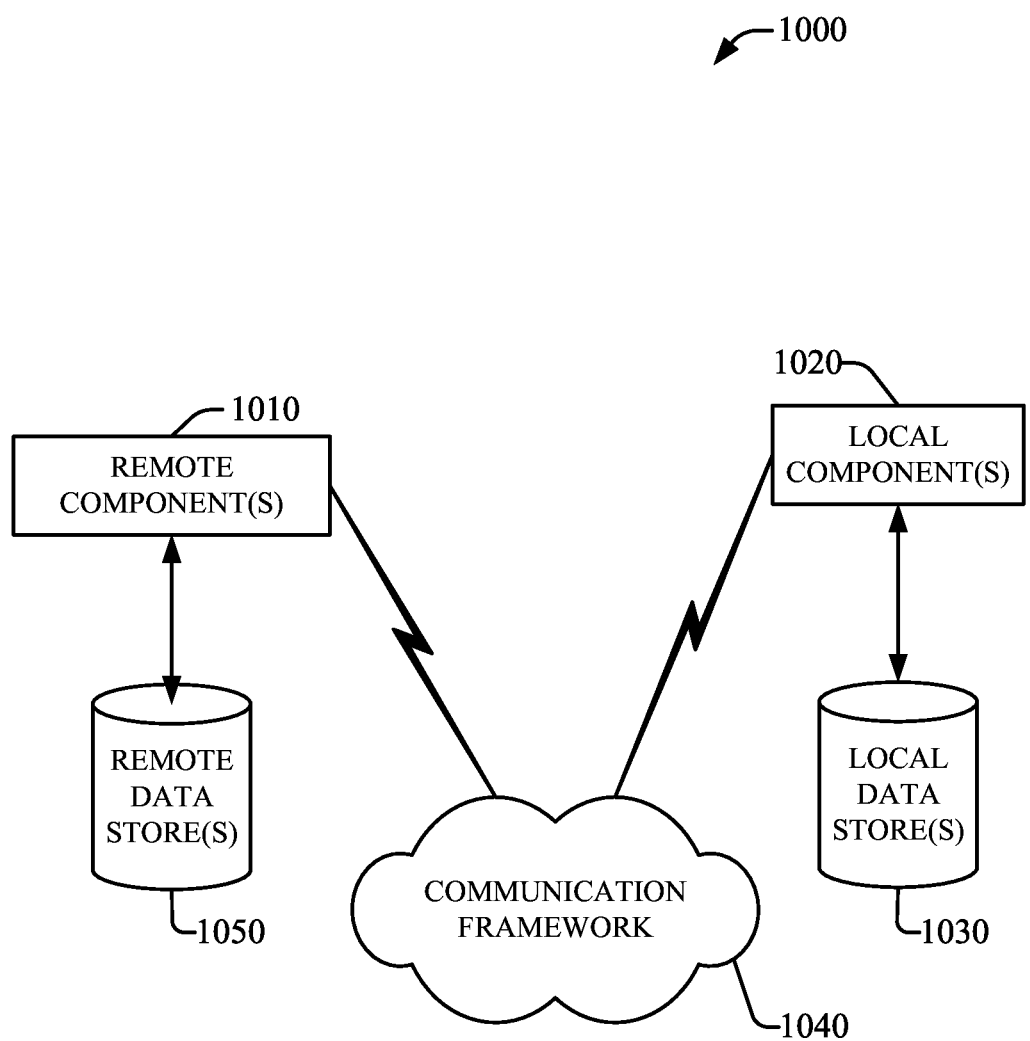
FIG. 10 is a block diagram representing an example computing environment into which aspects of the subject matter described herein may be incorporated.

FIG. 10 is a schematic block diagram of a computing environment 1000 with which the disclosed subject matter can interact. The system 1000 comprises one or more remote component(s) 1010. The remote component(s) 1010 can be hardware and/or software (e.g., threads, processes, computing devices). In some embodiments, remote component(s) 1010 can be a distributed computer system, connected to a local automatic scaling component and/or programs that use the resources of a distributed computer system, via communication framework 1040. Communication framework 1040 can comprise wired network devices, wireless network devices, mobile devices, wearable devices, radio access network devices, gateway devices, femtocell devices, servers, etc.

The system 1000 also comprises one or more local component(s) 1020. The local component(s) 1020 can be hardware and/or software (e.g., threads, processes, computing devices). In some embodiments, local component(s) 1020 can comprise an automatic scaling component and/or programs that communicate/use the remote resources 1010 and 1020, etc., connected to a remotely located distributed computing system via communication framework 1040.

One possible communication between a remote component(s) 1010 and a local component(s) 1020 can be in the form of a data packet adapted to be transmitted between two or more computer processes. Another possible communication between a remote component(s) 1010 and a local component(s) 1020 can be in the form of circuit-switched data adapted to be transmitted between two or more computer processes in radio time slots. The system 1000 comprises a communication framework 1040 that can be employed to facilitate communications between the remote component(s) 1010 and the local component(s) 1020, and can comprise an air interface, e.g., Uu interface of a UMTS network, via a long-term evolution (LTE) network, etc. Remote component(s) 1010 can be operably connected to one or more remote data store(s) 1050, such as a hard drive, solid state drive, SIM card, device memory, etc., that can be employed to store information on the remote component(s) 1010 side of communication framework 1040. Similarly, local component(s) 1020 can be operably connected to one or more local data store(s) 1030, that can be employed to store information on the local component(s) 1020 side of communication framework 1040.

Figure 11:
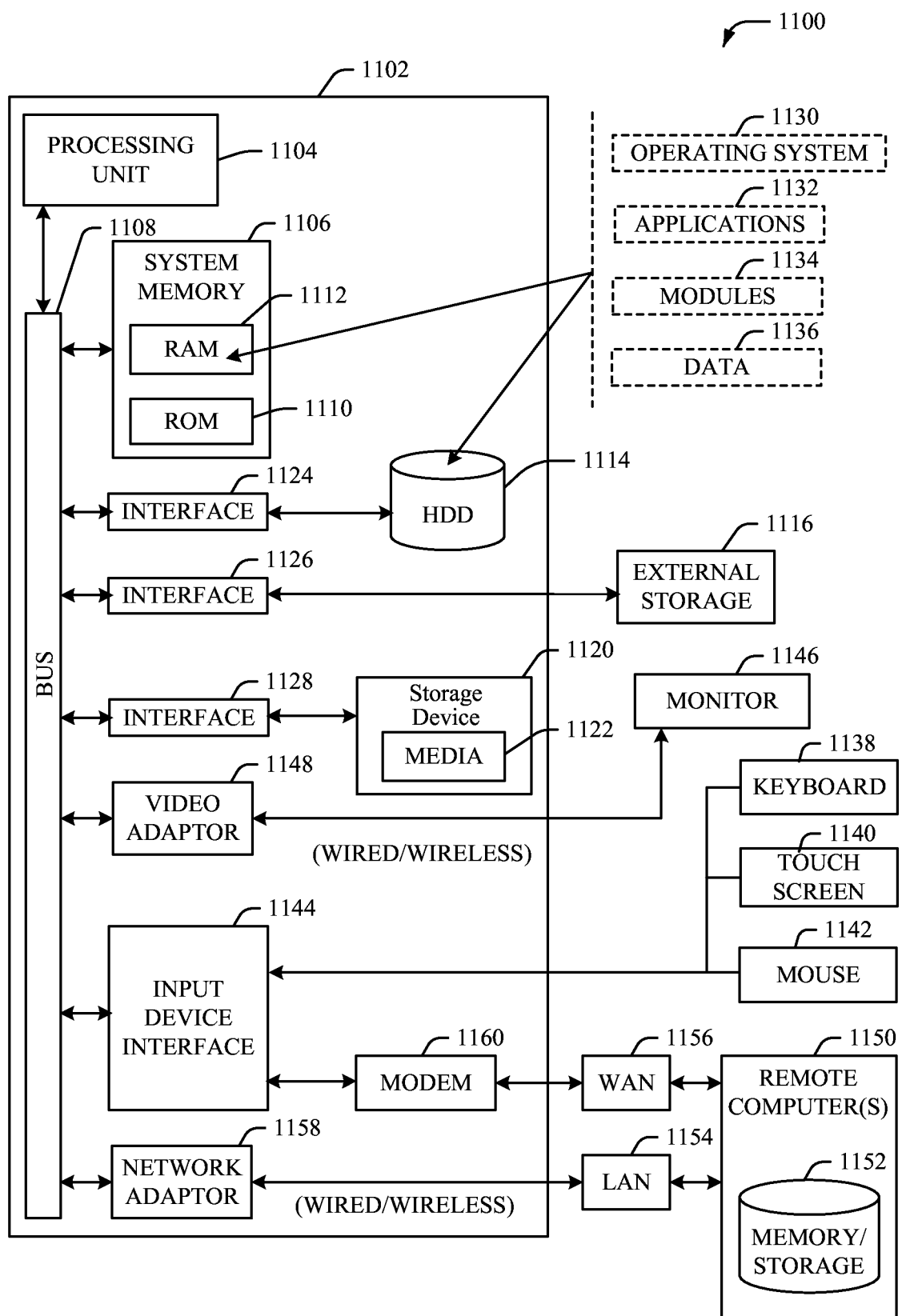
FIG. 11 depicts an example schematic block diagram of a computing environment with which the disclosed subject matter can interact/be implemented at least in part, in accordance with various aspects and implementations of the subject disclosure.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), and can include one or more external storage devices 1116 (e.g., a magnetic floppy disk drive (FDD) 1116, a memory stick or flash drive reader, a memory card reader, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114.

Other internal or external storage can include at least one other storage device 1120 with storage media 1122 (e.g., a solid state storage device, a nonvolatile memory device, and/or an optical disk drive that can read or write from removable media such as a CD-ROM disc, a DVD, a BD, etc.). The external storage 1116 can be facilitated by a network virtual machine. The HDD 1114, external storage device(s) 1116 and storage device (e.g., drive) 1120 can be connected to the system bus 1108 by an HDD interface 1124, an external storage interface 1126 and a drive interface 1128, respectively.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1094 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather are to be construed in breadth, spirit and scope in accordance with the appended claims.

What is claimed is:

1. A system, comprising:
a processor; and
a memory that stores executable instructions which, when executed by the processor of the system, facilitate performance of operations, the operations comprising:
receiving profile data corresponding to a user of a content providing service, the profile data associated with a request to access content of the content providing service via a device associated with the user;
selecting, based on a first age aspect, comprising a first biological age or biological age range of the profile data, a content option, selectable via use of an interface of the device, from a group of available content options,
wherein an age or age range of the user corresponds to the first age aspect;
selecting, based on a second age aspect, comprising a second biological age or biological age range of the profile data, which second biological age or biological age range is different than the first biological age or biological age range, a user interface style, for the interface, from a group of available user interface styles,
wherein the second biological age or age range is greater than the first biological age or age range; and
based on the user interface style selected and based on the content option selected, returning a user interface populated with the content option for rendering on a display of the device in response to the request.

2. The system of claim 1, wherein the operations further comprise determining, from the profile data, that the user is a non-adult type user.

3. The system of claim 1, wherein the operations further comprise determining, from the profile data, an age of the user, and wherein the selecting the user interface style comprises selecting the user interface style from the group of available user interface styles based on the age of the user.

4. The system of claim 3, wherein the operations further comprise mapping the age of the user to a category, in which the category is one of a group of categories corresponding to the group of user interface styles.

5. The system of claim 1, wherein the operations further comprise setting the profile data on the client device for use with subsequent requests for content.

6. The system of claim 1, wherein the operations further comprise setting a brownie comprising the profile data on the client device for use with subsequent requests for content.

7. The system of claim 1, wherein the operations further comprise locking the profile data on the client device to retain the profile data, after a logoff operation, for use after a subsequent login operation.

8. The system of claim 1, wherein the age of the user is less than the second biological age or the age of the user is less than and not comprised by the second biological age range.

9. The system of claim 1, wherein the use interface style has a greater quantity of human-readable text than another user interface style based on the first age aspect.

10. A system, comprising:
a processor; and
a memory that stores executable instructions which, when executed by the processor of the system, facilitate performance of operations, the operations comprising:
receiving a first request from a user device, the first request comprising profile data of a user;
determining a first age of the user based on the profile data;
selecting a first user interface based on a first biological age that is different than the first age of the user or a first biological age range that does not comprise the first age of the user, and selecting a first content option based on the first age of the user;
returning the first user interface comprising the first content option in response to the first request;
receiving a second request from the user device, the second request comprising the profile data of the user;
determining a second age of the user based on the profile data, wherein the second age is older than the first age;
selecting a second user interface based on a second biological age that is different than the second age of the user or a second biological age range that does not comprise the second age of the user, and selecting a second content option based on the second age of the user; and
returning the second user interface comprising the second content option in response to the second request,
wherein the first biological age is greater than the first age of the user, the first biological age range comprises ages all greater than the first age of the user, the second biological age is greater than the second age of the user, or the second biological age range comprises ages all greater than the second age of the user.

11. The system of claim 10, wherein the profile data comprises information that identifies the user as corresponding to a kid type profile.

12. The system of claim 10, wherein the second user interface comprises a representation of a content offering represented with a greater quantity of human-readable text than the first user interface.

13. The system of claim 10, wherein the first user interface comprises a representation of a content offering represented with a larger icon than the second user interface.

14. The system of claim 10, wherein the operations further comprise locking the profile data on the client device to retain the profile data, after a logoff operation, for use with a subsequent request for content after a subsequent login operation.

15. The system of claim 10, wherein the first biological age is less than the second age of the user or the first biological age range comprises ages all less than the second age of the user.

16. The system of claim 10, wherein the profile data defines at least a pair of individuals of the user.

17. A non-transitory machine-readable medium, comprising executable instructions that, when executed by a processor, facilitate performance of operations, the operations comprising:
receiving a profiles request for a group of profiles corresponding to a subscriber identity of a content providing service;
in response to the profiles request, returning a profiles response comprising the group of profiles;
receiving a token request for a token associated with a chosen profile of the profiles;

in response to the token request, returning the token and setting brownie data on the client device, the brownie data comprising profile data corresponding to the chosen profile;

receiving a first request for content associated with the brownie data; and in response to the first request for content, determining a first age category based on the brownie data, determining a second age category based on the brownie data, selecting a content option corresponding to the first age category, selecting a home page having an interface style corresponding to the second age category, and returning the home page comprising the interface style and the content option for rendering on a display of the client device, wherein the interface has an interface style that is selected from a group of available interface styles based on the second first age category, wherein the content option is selected from a group of available content options based on the first age category, wherein the first age category comprises a first set of biological ages, wherein the second age category comprises a second set of biological ages, wherein at least a portion of the biological ages of the first set of biological ages are greater than each of the biological ages of the second set of biological ages, and wherein a user age defined by the chosen profile corresponds to the first set of biological ages and is less than all of the biological ages of the second set of biological ages.

18. The non-transitory machine-readable medium of claim 17, wherein the operations further comprise receiving login credentials corresponding to a subscriber identity, authenticating the subscriber identity, and returning an interim token in response to the receiving the login credentials, and wherein the receiving the profiles request comprises receiving the profiles request in association with the interim token.

19. The non-transitory machine-readable medium of claim 17, wherein the operations further comprise receiving a second request for content associated with a token, the second request for content associated with invalid brownie data or unassociated with the brownie data, and in response to the receiving the second request, determining the profile data from the token, determining another instance of the brownie from the profile data, and resetting the brownie data on the client device based on the other instance of the brownie.

20. The non-transitory machine-readable medium of claim 17, wherein the age of the user is less than the second biological age or the age of the user is less than and not comprised by the second biological age range.

* * * * *